Aug. 24, 1965  CHIEN LIU  3,202,283
PROCESS AND APPARATUS FOR SEPARATING AN ICE-LIQUID MIXTURE
Filed Feb. 8, 1962
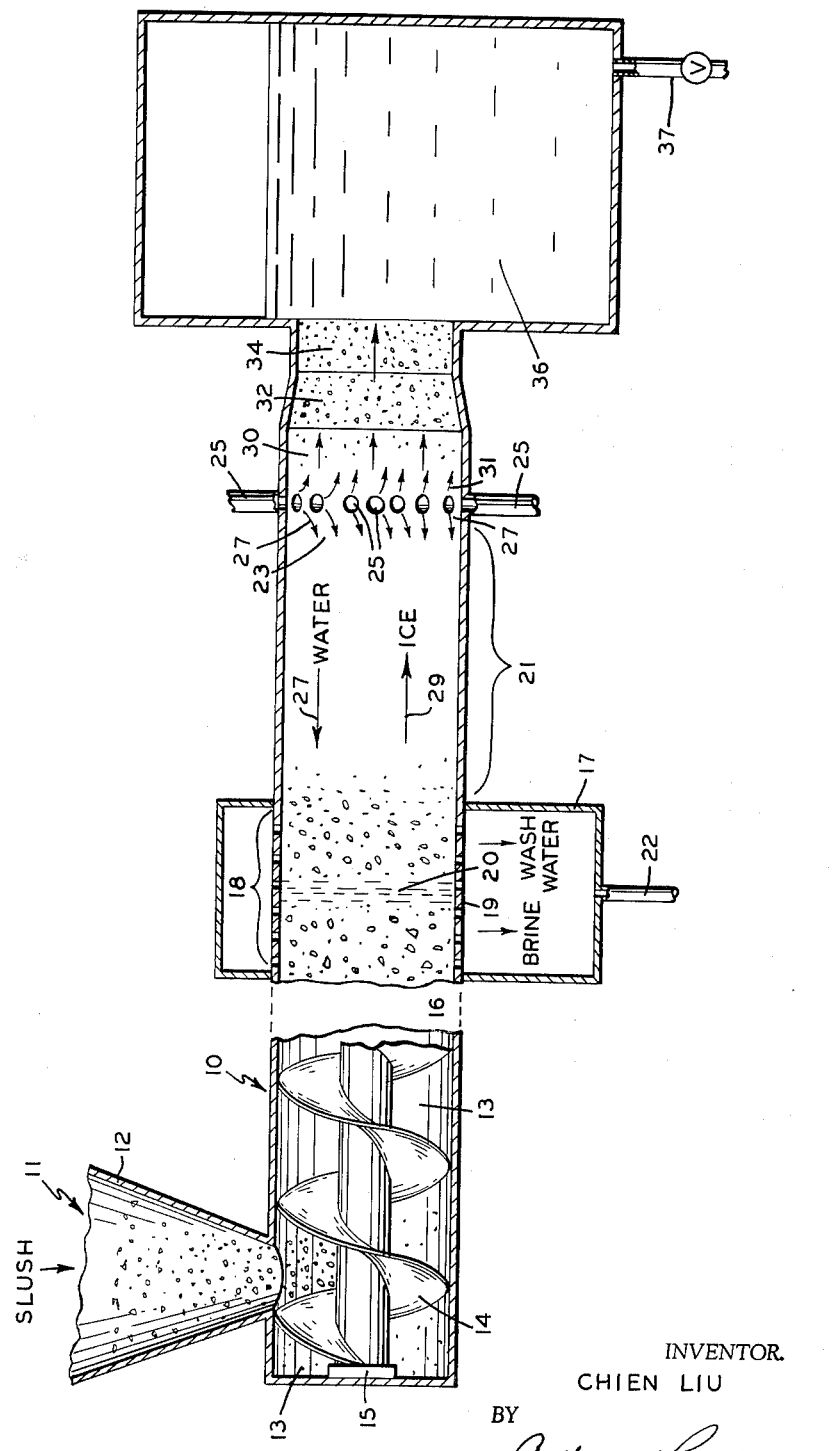
INVENTOR.
CHIEN LIU
BY
Arthur J. Plantamura
ATTORNEY.

United States Patent Office 3,202,283
Patented Aug. 24, 1965

3,202,283
PROCESS AND APPARATUS FOR SEPARATING AN ICE-LIQUID MIXTURE
Chien Liu, Stamford, Conn., assignor to American Machine & Foundry Company, a corporation of New Jersey
Filed Feb. 8, 1962, Ser. No. 171,993
10 Claims. (Cl. 210—71)

This invention relates to a method and apparatus for separating ice crystals from brine. More particularly, the invention is concerned with making potable water from sea water or from water supplies characterized as brackish or otherwise unsuitable for drinking and/or for agricultural use.

Desalting of water by first freezing the ice water or brackish water and thereafter separating the lower melting point brine from the ice crystals of almost pure water is known. Moreover, the freezing concept for purification of water is often cited as a theoretically promising and economically practical method for conversion of sea water, for example, when compared to conventional distillation processes. This process using frozen brine has the advantage of an inherently low energy requirement and the process may be accomplished at near atmospheric pressures and at low temperatures which minimize scaling and corrosion. Additionally, the freezing process has the advantage of requiring only low cost materials of construction and a minimum of pretreatment of the feed. This is a very substantial advantage in the construction of commercial size units.

One of the major problems associated with freezing processes, however, is a practical technique for the separation of ice crystals from the brine. Although various procedures for separation of the brine from the ice crystals have been proposed, e.g., counter-current washing or centrifuging, with or without controlled nucleation and growth of ice crystals, no process for the effective separation of ice crystals from the mother liquor has been established as being commercially practicable so as to produce potable water at sufficiently low cost. Also, although various freezing processes proposed have been demonstrated to produce an acceptable product on a laboratory or even pilot plant scale, the unsatisfactory process rate thus far has precluded economically satisfactory large scale or commercial size units.

The present invention is concerned with a process and apparatus for separating ice crystals from brine wherein the partially frozen feed, i.e., the mixture of ice crystals and liquid brine is continuously fed as by a screw conveyor while permitting the brine of the advancing mixture to drain while subjecting it to the displacement action of a counterflow wash water.

In the separation of ice crystals from a mixture thereof with brine liquid, there are two main aspects considered: First. The physical nature of the ice crystals which depends on many variables, e.g., the method of freezing, the concentration of impurities in the brine, the temperature deviation from equilibrium, the residence time, the nucleation conditions, etc. Secondly. The method of separating the ice crystals.

Under practical process conditions, dendritic crystals are formed in freezing sea water. The extended surface of dendritic crystals causes considerable amounts of brine to adhere to the crystals. Gravitational force does cause the water to drain off at a slow rate. However, the relatively dry slush obtained even after long periods of draining still contains too much brine to produce potable product water. Because of the great difference between the salt concentration in the brine and the limit of potability, only a very slight brine contamination can be permitted. The adsorption of water on the extended surface not only dictates the necessity of washing, but also the desirability of displacement washing mechanism with a minimum of mixing.

Various techniques for separating liquid brine from ice crystals in the past include the most commonly used counter-current washing and gravitational draining method. Because of the size and the dendritic structure of the crystals being handled, the mechanics of flow limits the washing to a very slow rate (in the order of 5 ft./hr.). The washing equipment for such methods is necessarily large and costly.

Forced counter-current washing by gas pressure and up-lifting of an ice column with hydrodynamic force has been proposed to improve the washing rate. However, in forced washing, the gas liquid interface is hydrodynamically unstable, therefore channeling of gas is unavoidable if the washing rate is pushed much beyond the gravitational draining rate (see Soffman and Taylor, Proc. Roy. Soc. A 245 (1958) 312). When channeling occurs, mixing of wash water and brine is likely to be considerable, and the requirement of wash water tends to be excessive. Usually after various attempts to use forced washing with gas pressure, the development generally reverts to gravitational draining, to establish displacement washing.

Another method seeks to improve the washing rate by controlling the crystal size to reduce the amount of adhering brine and by utilizing high speed centrifuge to raise the rate and effectiveness of draining. The crystal size is controlled by recycling the slurry (presumably to improve overall diffusivity and lengthening effective residence time). It is understood that the recycle ratio has to be very high to be effective, and for this reason this method also appears impractical for large scale plants.

Compression or compacting techniques collapse and recrystallize the ice structure to some degree and reduces the interstitial space, consequently, the amount of contained brine is reduced. The higher the pressure used in compacting, the smaller the interstitial space; consequently, the smaller the amount of contained brine. But, from available evidence, the interstitial volume cannot be reduced at a practical rate to the point (less than 1%) where the compressed slush becomes potable. Partial melting of ice under compression does provide wash water for displacement washing, but it must be noted that this way of providing washing water is rather a costly one; it requires many times the energy required to produce potable water of the same weight by average freezing processes because this amount of heat energy has to be pumped out from ice temperature to cooling water temperature though secondary refrigeration.

In accordance with the invention by treating the ice washing problem as a flow problem through porous media, the problem may be dealt with in the following manner. A substantial void volume is estimated to be present in the ice slush even if a moderate pressure is applied. Since the concentration of salts in brine derived from sea water is well above 35,000 p.p.m. (as of NaCl), the brine must be effectively displaced before the requirement of potability can be met. Because of the irregularity of the dendritic surfaces of the ice crystals, it is probably impossible to achieve perfect displacement. In a displacement washing process, to minimize the quantity of adhering brine, a stable interface is of critical importance, with appreciable channeling or turbulent mixing, an excessive amount of wash water will be necessary as dictated by materials balance. Because of the great difference in viscosity and density, the critical velocity for interface stability is much lower in the case of gas-liquid interface than in the case of liquid-liquid interface. This points to a basic disadvantage of methods such as vacuum suction or centrifuging as compared to water displacement washing.

The application of pressure in water displacement washing with liquid-liquid interface only, according to the invention, not only allows greater washing rates, but it also reduces the void volume which renders the washing process more efficient and the flow pattern more stable.

It has been found that the washing rate which is most suitable is generally below about 10 ft. per min. The wash water rate depends to some extent on the degree of mixing of the wash water and the brine as well as the net amount of adhering brine. A range of from about 5% to about 15% of product water to wash the draining ice crystals is generally suitable to cleanse the adhering brine liquid from the crystals.

It is a primary object of the present invention to provide a continuous process, and apparatus therefor, for the separation of liquid from a liquid-ice mixture.

It is a more specific object of the invention to provide a continuous process for the separation of more concentrated brine liquid from a mixture of the brine and pure ice crystals which is obtained by the partial freezing of brackish or sea water.

It is another object of the invention to provide a novel process wherein an ice-brine slush is continuously fed and drained of a liquid component while simultaneously subjecting the draining ice to a counter-current washing with liquid.

It is a further and particularly preferred object of the invention to provide a novel process for the production of relatively fresh water from an ice-brine mixture wherein the mixture is continuously fed through a zone which permits the liquid to drain from the mixture, including a wash liquid forced into said zone under pressure.

Other objects and advantages will become apparent as the description of the invention is presented in greater detail hereinbelow.

In carrying out the method of the invention, reference is had to the following description taken in conjunction with the accompanying drawing in which the single figure depicts schematically a suitable arrangement for carrying out the invention.

Referring in greater detail to the drawing, a mixture of brine and ice is fed at 11 through the hopper 12 into the screw conveyor zone 13. The mixture separating conduit is indicated generally as 10. A screw conveyor 14 of conventional design suitably mounted at 15 and (not shown) in zone 16 is utilized to move the frozen mixture. The screw 14 may comprise a hollow blading through which fluid may be circulated.

Although in the figure of the drawing, the screw 14 is shown terminating before zone 18, the invention also contemplates utilizing a screw which extends throughout the cylindrical unit and into the tank 36. Moreover, in this latter arrangement, the central shaft of the screw equipped with suitable apertures may be used for introducing wash water appropriately as at zone 23.

Any suitable means known in the art for freezing the liquid comprising the feed 11 may be utilized. As such, for example, is the process employing an immiscible secondary refrigerant in admixture with a pre-cooled brine in an open chamber. This freezing operation as well as other suitable means are described, for example, in the United States Department of Interior, Office of Saline Water Research and Development, Progress Reports Nos. 40 and 41, dated July and August, 1960, respectively, in which the technique for utilizing liquid butane and other organic materials for direct freezing techniques are disclosed. These procedures generally utilize liquid butane or other organic materials which are flashed under a slight vacuum with sea water to produce an ice-brine slush mixture.

Another means for freezing the brine, which may be employed, is the vacuum freezing technique disclosed in the United States Department of Interior, Office of Saline Water Research and Development, Progress Report No. 32, dated July 1959, at page 4.

The mixture fed into the zone under pressure of the screw 14 is advanced into the zone 18 comprising in essence a porous tube or section 19 through which the liquid fraction of the mixture drains out. The ice crystals in the zone 18 due to the pressure of the screw 14 and due to the counter-acting hydraulic pressure from the wash liquid fed into the zone 23 (hereinafter described in greater detail) forms a substantially solid ice pack in the zone 18 which is conducive to efficient washing by the wash liquid. The wash liquid introduced in the zone 23 through an annular arrangement of suitable apertures 25 and header is divided, due to the pressure resistances developed in the system, into an upstream fraction and a downstream fraction shown respectively by the arrows 27 and 31. As the ice mixture advances through the porous zone 18, it is substantially packed as it is subjected to the fraction of wash liquid 27 diverted toward the zone 18. The wash liquid moving counter-current to the advancing ice mass, passes through the washing zone 21 where it effectively displaces the liquid adhering to the ice crystals which move in the direction shown by arrow 29. Upon encountering the ice mass 29, the counter-current wash liquid 27 forms a barrier (in essence in a narrow zone rather than a distinct line of demarcation) at 20 which effectively prevents passage of the relatively concentrated brine entering with the feed at 13 from passing through zone 18 into the wash zone 21.

A portion of the wash liquid 31 introduced into the zone 23 facilitates advance of the ice mass through the discharge zones 30, 32 and 34. In the discharge zone 32, advance of the mass is subjected to a static pressure maintained in tank 36 and/or is restricted through the relative narrow conduit section 34 to afford the necessary back pressure necessary for effective results in zones 18 and 21. The ice and wash water fraction 31 collected at the melter and/or storage tank 36 is melted by any suitable means known in the art such as by heat-exchange arrangement in which compressed secondary refrigerant, e.g. butane vapor, utilized in freezing the feed liquid is employed.

It will be understood that although certain details have been illustrated and described for suitably carrying out the invention, various modifications apparent to those skilled in the art may be made without departing from the present inventive contribution. Thus, although an arrangement comprising a screw conveyor feed has been described, various other means may be employed to advance the mass. In processing the ice column formed from the ice and liquid mixture, a wash for said column at any suitable additional zone along the line may be employed to rinse the occluded relatively concentrated brine from the ice crystals' surface. For this purpose, either the starting liquid, which is relatively less concentrated than the liquid sought to be washed off the ice crystals, or product liquid may be utilized.

The invention has been described primarily in conjunction with the separation of a mixture of ice crystals and brine, but it will be apparent that the inventive concept with suitable and obvious modifications will readily lend itself to the separation of other materials, e.g. concentration of fruit juices or other beverages, by removal of ice (water) crystals from a frozen mixture producing a liquid relatively high in solids.

It will be apparent to those skilled in the art that various modifications may be made in the invention presented without departing from the scope of the invention. Accordingly, the invention is not to be limited except insofar as necessitated by the appended claims.

I claim:

1. A method for separating ice and liquid in a feed mixture which comprises continuously advancing said mixture, compressing said mixture so that the ice forms a substantially solid pack as the mixture is introduced into a draining zone, introducing under pressure, downstream of said draining zone and in direct contact with the packed ice, a wash liquid which is in part directed counter-current to said ice mass, withdrawing from said draining zone the liquid present in the feed together with the wash liquid and removing the washed ice mass downstream of the point of said wash liquid introduction.

2. The method of claim 1 in which the feed mixture is advanced through said zone at a rate not in excess of about 10 feet per minute.

3. The method of claim 1 in which the removal of ice mass downstream of said wash liquid introduction point is restricted to promote packing of the ice mass in the system.

4. A method for separating a mixture of ice and brine which comprises continuously advancing said mixture, compressing said mixture so that the ice forms a substantially solid pack as the mixture is introduced into a draining zone, introducing under pressure, downstream of said draining zone and in direct contact with the packed ice, a wash water which is in part directed counter-current to said ice mass, withdrawing from said draining zone the brine present in the feed together with the wash water and removing the ice mass downstream of the point of said wash water introduction.

5. An apparatus for continuously separating liquid from a liquid-ice mixture which comprises a feed zone provided with a feed inlet and means for advancing and compacting the ice in the feed to a substantially solid ice pack, a draining zone into which the packed feed is advanced, said draining zone comprising a porous section permitting the exiting of liquid from the zone but substantially retaining the ice mass of said mixture, a wash liquid zone downstream of said draining zone into which wash liquid is introduced under pressure and means for providing pressure against the advancing compacted ice mass to effect diversion of at least part of the wash liquid introduced into said liquid introduction zone in a direction counter-current to the advancing ice mass.

6. The apparatus of claim 5 wherein the means for advancing the feed comprises a screw conveyor and the draining zone comprises a cylindrical section with suitable apertures.

7. The apparatus of claim 5 in which the means for providing pressure against the advancing ice mass comprises a suitable restriction in the flow passage.

8. The apparatus of claim 5 in which the means for providing pressure against the advancing ice mass comprises static pressure.

9. An apparatus for continuously separating liquid from a liquid-ice mixture and thereafter washing the ice mass which comprises a feed zone for said mixture provided with a feed inlet and screw conveyor means for advancing the mixture, a draining zone into which the mixture is advanced which comprises a porous section permitting the exiting of liquid but substantially retaining the ice portion of said mixture, a wash liquid downstream zone into which wash liquid is introduced under pressure, means downstream of said wash liquid zone for providing pressure against the advancing ice mass to form a compact mass in said wash zone and means to effect diversion of at least part of the wash liquid introduced into said wash liquid zone in a direction counter-current to the advancing ice mass.

10. An apparatus for continuously separating liquid from a liquid ice mixture which comprises a substantially cylindrical conduit, a feed zone provided with a feed inlet and screw conveyor means for advancing the feed, a draining zone into which the feed is advanced, said draining zone comprising a porous section permitting the withdrawal of liquid but substantial retention of the ice mass from said mixture, a wash liquid zone downstream of draining zone into which wash liquid is introduced under pressure and means comprising a reduction in the cylindrical conduit downstream of said wash liquid zone for providing pressure against the advancing ice mass to form a compact mass thereof and to effect diversion of at least part of the wash liquid, introduced into said liquid introduction zone in a direction counter-current to the advancing ice mass.

References Cited by the Examiner
UNITED STATES PATENTS 3,019,611    2/62    Toulmin _____ 62—58
3,069,864   12/62    Crosby _____ 62—58

REUBEN FRIEDMAN, *Primary Examiner.*